United States Patent [19]

Kiuchi et al.

[11] 3,919,049
[45] Nov. 11, 1975

[54] PROCESS FOR PREPARING β-GALACTOSIDASE

[75] Inventors: Akira Kiuchi, Kawaguchi; Yuji Tanaka, Tokyo, both of Japan

[73] Assignee: Tokyo Tanabe Co., Ltd., Japan

[22] Filed: June 27, 1974

[21] Appl. No.: 483,896

[52] U.S. Cl. ............................ 195/66 R; 195/65
[51] Int. Cl.$^2$ .................................. C12D 13/10
[58] Field of Search ..................... 195/65, 66 R

[56] References Cited
UNITED STATES PATENTS

| | | | |
|---|---|---|---|
| 3,629,073 | 12/1971 | Cayle | 195/66 R |
| 3,816,259 | 6/1974 | Collinge et al. | 195/62 |

*Primary Examiner* — Lionel M. Shapiro
*Attorney, Agent, or Firm* — McGlew and Tuttle

[57] ABSTRACT

An acid-active, acid-stable β-galactosidase is prepared from the cultured material of a strain of *Aspergillus oryzae*. Said enzyme is recovered, in case of the liquid culture, by means of precipitation from the cultured broth by adding organic solvent thereto, while in case of the solid culture, the enzyme is recovered from the cultured material by means of extraction using water and succeeding precipitation from the resulting aqueous solution by adding organic solvent thereto. The precipitates thus obtained in both cases may further be refined in the routine manner. The present acid-active, acid-stable β-galactosidase is useful for recovering or preventing of vomit or diarrhoea due to the β-galactosidase deficiency or lactose intolerance.

7 Claims, 2 Drawing Figures

PROCESS FOR PREPARING β-GALACTOSIDASE

BACKGROUND OF THE INVENTION

1. Field of the Invention

This invention relates to a process for preparing β-galactosidase, or so-called lactase. More particularly, the invention relates to a process for preparing an acid-active, acid-stable β-galactosidase, comprising culturing a new strain belonging to *Aspergillus oryzae* in a nutrient medium and recovering said enzyme from the cultured material thereof.

β-galactosidase is an enzyme which catalyzes the hydrolysis of aryl β-D-galactopyranoside such as lactose to yield galactose, glucose, and the like. Such lactose is one of the main components of milk and products derived from milk which have long been used as important nutrients of mankind and animals. While lactose may be generally digested in living body after having been hydrolyzed to form glucose and galactose by the β-galactosidase which exists normally in the intestinal juices and mucosa, recent investigations have shown that a significant portion of the human population suffers from β-galactosidase deficiency or lactose intolerance, where vomit or diarrhoea will occur in case of taking lactose containing diets.

β-galactosidase preparation is useful for recovering or preventing of such vomit or diarrhoea due to said enzyme deficiency or lactose intolerance. Consequently, it is needed that the enzyme preparation is so acid-stable that the activity thereof is not reduced by the acidity of the gastric juice in case of the oral administration of the said preparation.

2. The Prior Art

The above-mentioned β-galactosidase is known for a long time, and many studies have been reported about the preparation thereof from the cultured materials of bacteria, yeasts and fungi, and from the plant or animal bodies, and further about the characteristics thereof. However, the physico-chemical and enzymological characteristics of such β-galactosidases differ from each other, depending on the difference of the origins from which they have been prepared, as is true for all kinds of enzyme preparations.

More particularly, according to those literatures, various kinds of microorganisms such as *Saccharomyces fragilis*, *Torulopsis spherica*, *Zygosaccharomyces lactis*, *Torulopsis lactis*, *Torula utilis*, *Candida pseudotropicalis*, *Lactobacillus bulgaricus*, *Aspergillus oryzae*, *Aspergillus niger*, *Aspergillus flavus*, *Penicillium notatum*, and the like, are described to be the origins from which β-galactosidases may be derived, however, the most of the β-galactosidases prepared thereby, have the optimum pH on the alkaline side or in the weakly acid range, and further, the most of these conventional β-galactosidase preparations contain other enzymes in admixture therewith, for example, proteases and amylases, which are rather the predominant components in the mixture.

It is recently disclosed that acid-stable β-galactosidase has been prepared from the cultured material of *Aspergillus niger*, which β-galactosidase has the optimum pH on the acid side (cf. U.S. Pat. No. 3,629,073). However, there is no description as to the accumulating amount of the enzyme in the cultured material of *Aspergillus niger* in this disclosure, and moreover, it has been recognized through the trace-experiments thereof carried out by us that such accumulating amount of the β-galactosidase is rather low.

SUMMARY OF THE INVENTION

Contrary to the above-mentioned, the present invention is the provision of a process for preparing an acid-stable β-galactosidase preparation at markedly higher yield by employing a new strain of *Aspergillus oryzae*, which new strain of *Aspergillus oryzae* is selected from a plenty of yeasts, bacteria and fungi, all of which being either already known as the type-cultures or newly isolated by us, through examining the β-galactosidase production therewith. The strain of *Aspergillus oryzae* is newly isolated from soil in Chiba-ken, Japan, and the β-galactosidase preparation produced therewith exhibits the highest activity at about pH 4.5, while being stable in the wide range of pH 3.5–9. This strain has been deposited in the American Type Culture Collection, of Rockville, Maryland, U.S.A., under the indentification number of ATCC 20423, and in the Agency of Industrial Science & Technology, of Chiba-shi, Chiba-ken, Japan, under the identification number of FERM-P 1680.

OBJECTS OF THE INVENTION

Accordingly, it is an object of the present invention to provide an process for preparing an acid-stable β-galactosidase at high yield using a new strain of *Aspergillus oryzae*.

It is another object of the present invention to provide a process for preparing an acid-stable β-galactosidase inexpensively.

It is still another object of the present invention to provide a process for preparing a β-galactosidase stable during the storage period.

Other objects and advantages of the present invention will be apparent from the description hereinafter referring to the accompanying drawings, in which.

DESCRIPTION OF THE INVENTION

Figure 1:
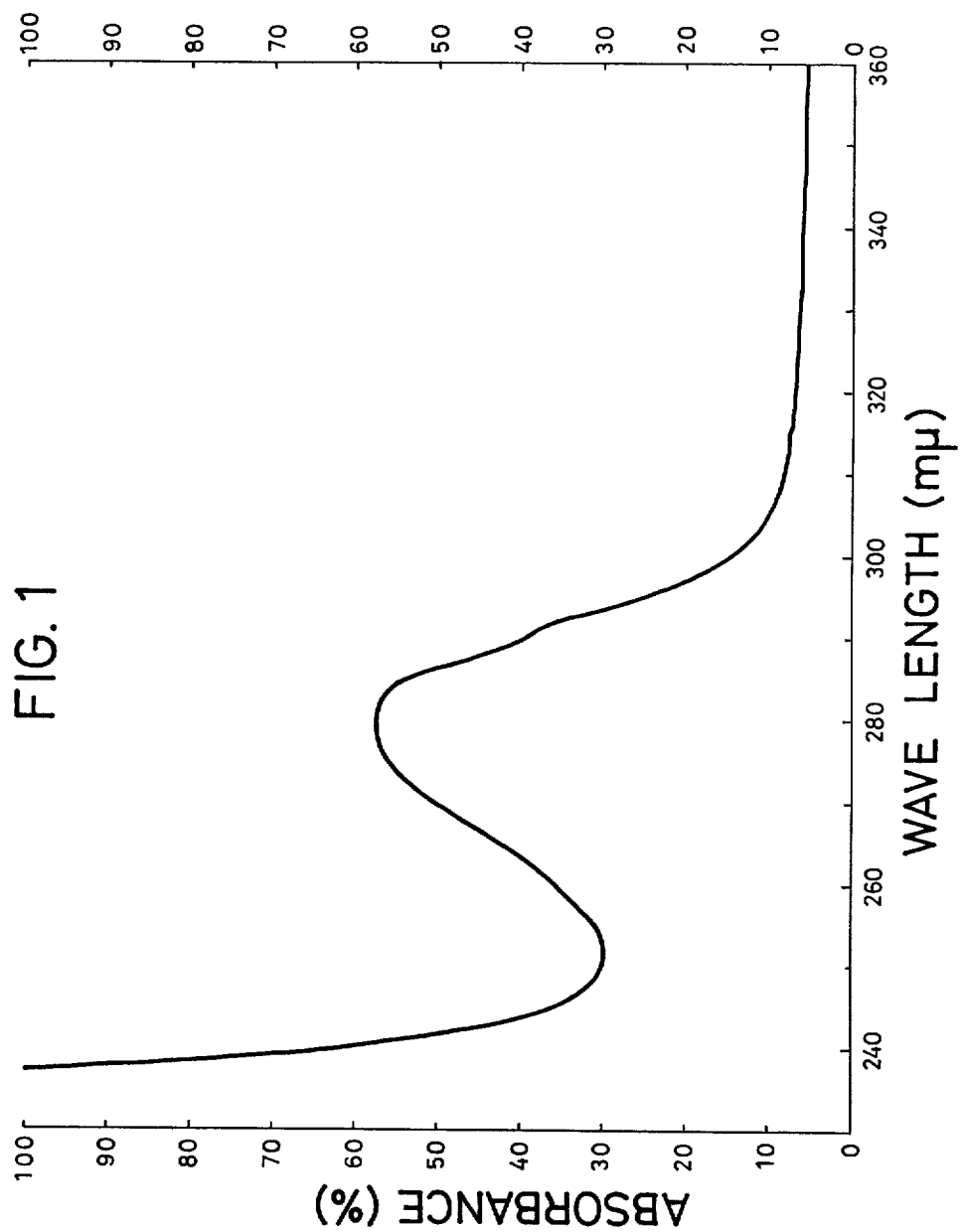
FIG. 1 shows the ultraviolet absorption spectrum of the β-galactosidase produced in the present process, recorded by using a Recording Spectrophotometer (HITACHI, Type EPS-3T).
Figure 2:
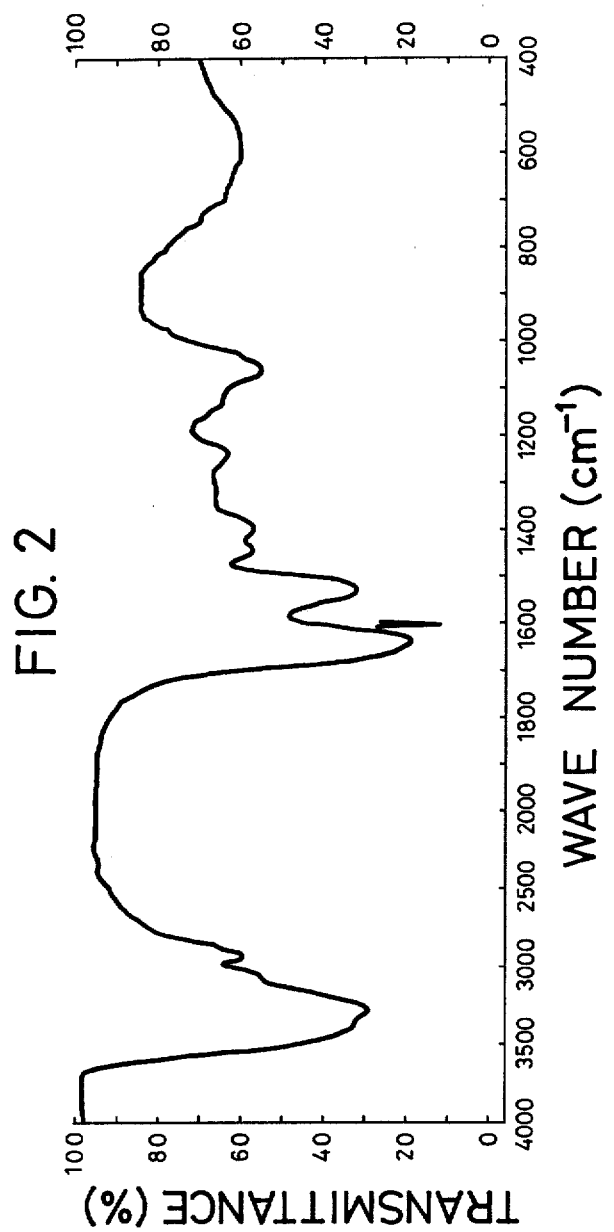
FIG. 2 shows the infrared absorption spectrum of the β-galactosidase produced in the present process, with KBr tablet, recorded by using a Grating Infrared Spectrophotometer (HITACHI, Type EPI-G2).

The microbiological characteristics of the Aspergillus oryzae ATCC 20423 used in the process according to the invention are as follows:

I. Morphological characteristics:
 The mycelia of 1–2 mm length grow densely. The tip of conidiophore is subglobose to form a vesicle having a width of 20–40μ. The vesicle bears a number of sterigmata having a size of 15–25 × 6–8μ, and conidia having a size of 6–8μ are yielded on the tips of the sterigmata. The surface of conidia is smooth, while the surface of conidiophore is rough, especially in the part near the vesicle. No perithecium is formed.

II. Cultural characteristics (after 10 days cultivation at 30°C, unless otherwise specified):
 1. Malt-extract agar medium: Grows well, the colony being greenish brown and bearing velvety aerial mycelia abundantly. No production of soluble pigment.

2. Czapek's agar medium: Grows normally, the colony being brown and bearing velvety aerial mycelia abundantly. No production of soluble pigment.
3. Potato-dextrose agar medium: Grows well, the colony being greenish brown and bearing velvety aerial mycelia abundantly. No production of soluble pigment.
4. Gelatin medium (cultured at 25°C): Grows normally or weakly, the colony being deep brown. Slow liquefaction.

(III) Physiological characteristics:
1. Temperature range for growth: 20°–45°C
2. Optimum temperature for growth: 30°–35°C
3. Optimum pH for growth: pH 4–6
4. Gelatin liquefaction: Slow
5. Utilizability of ethanol: Slow
6. Decomposition of pectin: Slow
7. Decomposition of tannin: Slow
8. Utilizability of carbon sources: Utilizes arabinose, xylose, glucose, mannose, galactose, fructose, maltose, sucrose, melibiose, trehalose, raffinose, inulin, dextrine and starch, but does not utilize cellulose.

The above-described microbiological characteristics are compared with those described in K. B. Raper and D. I. Fennel: "The Genus Aspergillus," p.370 (1965) and Kin-ichiro Sakaguchi and Koichi Yamada: Nippon Nogeikagaku Kaishi, Japan, 20, pp.65 and 141 (1944), whereby it has been identified that the strain belongs to the species *Aspergillus oryzae*. However, the significant difference from the conventional strains belonging to the species *Aspergillus oryzae*, lies in that the present strain accumulates a remarkable amount of acid-stable β-galactosidase in its cultured materials.

The cultivation of the above-mentioned *Aspergillus oryzae* ATCC 20423 in the process of the present invention is carried out in the manner of either the submerged culture using liquid media, or the surface culture using solid media, under the aerobic condition, at the temperature of 25°–30°C. As the carbon sources in the case of employing liquid media, are desirably used glucose, dextrine, sucrose, and the like, and as the nitrogen sources are advantageously used such organic or inorganic materials as yeast-extract, peptone, meat-extract, cornsteep liquor, soybean meal, bacto soytone, potato-extract, malt-extract, casein, ammonium citrate, ammonium tartarate, ammonium nitrate, sodium nitrate, and the like. Further, to the media may be added appropriate mineral materials such as sodium salts, potassium salts, calcium salts, magnesium salts, phosphoric salts, and the like.

On the other hand, as solid media may be used such materials as having hitherto generally been employed, that is, wheat bran, soybean meal, rice bran, and the like, and if necessary, the nitrogen sources and/or the mineral materials mentioned in said case of using the liquid media may be added to the solid media. The surface culture using the solid may be practised by means of either the solid culturing apparatus of aeration type, or the solid culturing apparatus of rotatory-drum type. Such solid culture of the microorganism in the present invention is completed in 3–7 days from the beginning of the culture. In the present invention, the solid culture is superior to the liquid culture in both points of the growth of the organism and the production of β-galactosidase. For example, when wheat bran is inoculated with the microorganism, followed by incubation of the microorganism at 30°C for 5 days, good growth of the organism and the maximum accumulation of β-galactosidase in the cultured material will be attained.

The β-galactosidase thus accumulated in the cultured material may be recovered, in the case of the liquid culture, by subjecting the filtrate of the cultured broth to the routine procedures for separating and refining of the enzyme. In case of the solid culture, to the cultured material is added the water in an amount of 5–10 times as much as that of the cultured material, and after being stirred for 1–5 hours, the resulting mixture liquid is filtered or centrifuged, and the filtrate thus obtained is subjected to the routine procedures as in the case of the liquid culture. The β-galactosidase of the present *Aspergillus oryzae* ATCC 20423 is an extracellular enzyme, so that more than 95 percent of said enzyme may be readily extracted with water without any destruction of the cell of the microorganism. This matter constitutes one of the merits of the present invention.

As the routine procedures for separating and refining of the enzyme mentioned in the above, firstly, either the precipitation of β-galactosidase from the aqueous solution by adding thereto the hydrophilic organic solvent such as ethanol, isopropanol, acetone, or the like, or the salting-out of the enzyme from the aqueous solution by adding thereto the inorganic salt such as ammonium sulfate, sodium sulfate, magnesium sulfate, or the like, may be referred to. Said procedures may also be carried out in such a manner that, the aqueous solution of the enzyme is concentrated under reduced pressure, and thereafter the concentrate is treated with the above-mentioned addition of organic solvent or inorganic salt.

Thus formed precipitate is collected by centrifugation, and lyophilized immediately or after being subjected to further refining treatments. For example, the precipitate is dissolved in 0.05 M tris-HC1 buffer solution or 0.05 M phosphate buffer solution, and the impurities contained are dialysed and removed therefrom into the same kind of buffer solution through the dialytic membrane. The dialysate (or remained buffer solution) may be further subjected either to the ion-exchange column-chromatography using ion-exchange resine, ion-exchange cellulose or ion-exchange Sephadex, or to the gel-filtration using Sephadex or Biogel. By combining the appropriate refining procedures selected from those as above-described, β-galactosidase preparations having various grades of activity may be obtained.

In the present specification, the activity of the β-galactosidase is estimated through the hydrolysing activity of said enzyme in the respective cases of using o-nitrophenyl β-D-galactopyranoside, p-nitrophenyl β-D-galactopyranoside (these terms are represented in short by "ONPG" and "PNPG" respectively, hereinafter in the specification) and lactose, as the substrates. The respective procedures are as follows:

a. Hydrolytic activity of the enzyme for ONPG or PNPG: To 3.5 ml. of 0.1M citrate-phosphate buffer solution (pH 4.5) containing 6 mg. of ONPG is added 0.5 ml. of enzyme solution, and after being incubated at 30°C for 10 minutes, 1 ml. of 1M sodium carbonate solution is added to the mixture liquid so as to stop the enzymatic reaction. The amount of the o-nitrophenol formed in the reacted solution is estimated through comparing the absorbance at the wavelength of 420 mμ measured by using a spectrophotometer (HITACHI, Type 101), with the standard curve prepared in advance using refined o-nitrophenol. Thus, β-galactosidase unit for ONPG is defined as that amount of the enzyme which will produce $10^{-6}$ mole of o-nitrophenol per minute at 30°C (such unit has been prescribed by the International Union of Biochemistry, Enzyme Committee). β-galactosidase unit for PNPG is defined similarly as that for ONPG, except employing PNPG as the substrate and the wave-length of 410 mμ instead of ONPG and 420 mμ, respectively.

b. Hydrolytic activity of the enzyme for lactose: To 4.5 ml. of 0.1M citrate-phosphate buffer solution (pH 4.8) containing 272 mg. of lactose is added 0.5 ml. of enzyme solution, and after being incubated at 30°C for 10 minutes, the liquid mixture is heated on a boiling water-bath for 2 minutes so as to stop the enzymatic reaction. 0.5 ml. of the reacted solution is taken out and added to 3.0 ml. of Glucostat reagent (consisting of glucose-oxydase and peroxidase), and after the mixture liquid is incubated at 37°C for 60 minutes, 0.5 ml. of 5N HCl is added thereto so as to terminate the enzymatic reaction. The amount of the glucose formed into the reaction solution is estimated by comparing the absorbance at the wave-length of 400 mμ measured by using the spectrophotometer, with the standard curve prepared in advance. Thus, β-galactosidase unit for lactose is defined as that amount of the enzyme which will produce $10^{-6}$ mole of D-glucose per minute at 30°C.

The physico-chemical characteristics of the β-galactosidase prepared in the process according to the present invention are as follows:

1. Substrative specificity and catalysis therefor: This enzyme specifically hydrolyses β-D-galactopyranosyl compounds. That is, lactose (or β-D-galactopyranosyl D-glucoside), ONPG, PNPG, phenyl β-D-galactopyranoside, and the like, are hydrolysed to yield galactose together with a member selected from the group consisting of glucose, o-nitrophenol, p-nitrophenol and phenol.

2. Effect of pH on activity: The activity of the enzyme at various values of pH is studied respectively with lactose, ONPG and PNPG, as the substrates, under the incubation conditions of the temperature of 30°C and the period of 10 minutes. The value of the relative activity is calculated from the ratio of the corresponding activity to that at pH 4.8 (as to lactose) or 4.5 (as to ONPG). The results are shown in Table I, from which it is recognized that the values of the optimum pH residue on acid side.

TABLE I

| pH | Relative Activity (%) | | |
|---|---|---|---|
| | Lactose | ONPG | PNPG |
| 2 | 16 | 4 | 2 |
| 3 | 47 | 73 | 72 |
| 4 | 86 | 97 | 99 |
| 4.5 | 95 | 100 | 100 |
| 4.8 | 100 | 93 | 99 |
| 5.0 | 99 | 84 | 97 |
| 6.0 | 66 | 26 | 49 |
| 7.0 | 29 | 3 | 12 |

3. Effect of temperature on activity: Table II shows the effect of the incubation temperature on the enzyme activity using ONPG as the substrate, under the incubation conditions of pH 4.5 and the period of 10 minutes. The value of the relative activity is calculated from the ratio of the corresponding activity to that at the temperature of 50°C. It is understood that the maximum activity is exhibited at 50°C.

TABLE II

| Temperature (°C) | Relative Activity (%) |
|---|---|
| 10 | 11 |
| 20 | 25 |
| 30 | 48 |
| 40 | 79 |
| 50 | 100 |
| 60 | 32 |
| 70 | 3 |

4. Effect of pH on stability: In order to examine the effect of pH values on the enzyme stability, the enzyme solutions having various values of pH of from 3.0 to 9.5, are allowed to stand at 30°C, for 1 hour, respectively, and the remaining β-galactosidase activity in each solution is then estimated using ONPG as the substrate. The value of the relative activity retained is calculated from the ratio of the corresponding activity retained to that examined at pH 6. The results are shown in Table III, from which it is recognized the enzyme is reasonably stable in the pH range of 3.5 to 9.0.

TABLE III

| pH | Relative Activity Retained (%) |
|---|---|
| 3 | 12 |
| 3.5 | 69 |
| 4 | 92 |
| 5 | 100 |
| 6 | 100 |
| 7 | 100 |
| 8 | 100 |
| 9 | 92 |
| 9.5 | 18 |

5. Effect of temperature on stability: In order to examine the effect of the temperature on the enzyme stability, the enzyme solutions having pH 6.0 are incubated at temperatures of from 30°C to 60°C, for 10 minutes. The remaining enzyme activity is determined using ONPG as the substrate, and the relative activity retained is calculated from the ratio of the corresponding activity retained to that examined at the temperature of 30°C. The results are as shown in Table IV, and the enzyme is reasonably stable at 50°C for 10 minutes.

TABLE IV

| Temperature (°C) | Relative Activity Retained (%) |
|---|---|
| 30 | 100 |
| 40 | 100 |
| 50 | 88 |
| 60 | 15 |

6. Inhibitor, activator and stabilizer: The hydrolyzing reaction by the present enzyme is inhibited either by $10^{-2}$M concentration of $Cu^{++}$ or $Ag^{++}$, or by $10^{-4}$M concentration of $Hg^+$, while being neither inhibited or activated by $10^{-2}$ to $10^{-4}$M concentration of other various metal ions. And, the enzyme activity is completely lost either by $10^{-4}$M concentration of N-bromosuccinimid or by $10^{-2}$M concentration of sodium laurylsulfate. However, $10^{-2}$M concentration of so-called EDTA, mercaptoethanol, hydrogenperoxide, sodium thiosulfate, cysteine, ascorbic acid, or the like, reveals no effect on the activity of the enzyme. Besides, in case of lyophilizing either the precipitate or the refined liquor derived from the cultured materials in the present process, the stability of the enzyme during such lyophilizing step is improved by the previous addition of maltose or glucose thereto in an amount corresponding to 10–30 percent of the solid material of the said precipitate or refined liquor.

7. Elementary analysis: C: 46.42 %; H: 6.76%; N: 12.21 %.

8. Molecular weight: The apparent molecular weight of the enzyme is estimated by means of applying the Sephadex G-200 gel filtration process and the sucrose density gradient centrifugation process, respectively, to give the value of approximately 105,000 in both cases.

9. Ultraviolet absorption spectrum: FIG. I shows the ultraviolet absorption spectrum of the enzyme, from which a maximum absorbance is recognized at the wave-length of 280 m$\mu$.

10. Infrared absorption spectrum: The infrared absorption spectrum with KBr is shown in FIG. II.

11. Colour and state: White powder

The $\beta$-galactosidase prepared in the present process has the above-described physico-chemical characteristics, which characteristics are recognized to be different from those of the $\beta$-galactosidases having been prepared by using the conventional species belonging to genus Aspergillus. That is, the present enzyme differs from the most of the conventional $\beta$-galactosidases in the point that the optimum pH of the latter resides near the neutrality, and further differs from the enzyme prepared by using *Aspergillus niger* and having the optimum pH on the acid side, in the points of "species" of the microorganisms employed, pH range for stability, optimum pH, and the like. Furthermore, the accumulating yield of the enzyme in the present invention is significantly higher compared with those in the preparation of the conventional enzymes, and thus, this unique characteristic of the present enzyme (or microorganism), upon incorporation with another characteristic of this enzyme that it is acid-stable, makes it facile to apply the process of this invention industrially.

The following examples serve to illustrate the invention without however limiting it any way:

EXAMPLE 1

20 g. of wheat bran and 20 ml. of tap water are placed in a 500 ml. Erlenmeyer flask are sterilized. After being cooled, the medium is inoculated with a platinum loopful of spores of *Aspergillus oryzae* ATCC 20423 having been cultured on potato-dextrose agar, and the microorganisms are incubated at about 30°C for 5 days. Such cultivation of the microorganism as above-described is carried out using 10 flasks, and the cultured materials thereof are collected (ca.232 g.). To this material is added 2 liters of tap water, and after being stirred for 2 hours, the mixture liquid is filtered to give 1914 ml. of filtrate, the $\beta$-galactosidase activity of which is 57.4 ONPG Units/ml.or 43.3 Lactose Units/ml.

The said filtrate is decolourized with active charcoal, and the resulting filtrate is cooled to 15°C. To the filtrate is added the isopropanol having been cooled to 10°C, while stirring, and the precipitate formed is centrifuged. 20 ml. of tap water is added to this precipitates, and the resulting mixture liquid is lyophilized at temperatures of from −30°C to +20°C, under pressures of 0.1–0.2 mmHg, whereby 4.3 g. of white enzyme powder is obtained, the $\beta$-galactosidase activity of said powder being 16,300 ONPG Units/g. or 12,400 Lactose Units/g.

EXAMPLE 2

20 g. of wheat bran and 12 ml. of tap water are placed in a 500 ml. Erlenmeyer flask and sterilized. After cooling, the medium is inoculated with a platinum loopful of spores of the microorganisms having been cultured on potato-dextrose agar, and the microorganisms are incubated at 30°C for 7 days. Such cultivation of the microorganism as above-described is carried out using 10 flasks, and the cultured materials thereof are collected aseptically, followed by adding the same to the sterilized medium consisting of 61 kg. of wheat bran and 84 liters of tap water, which medium being held in a solid culturing apparatus of aeration type. The inoculated medium is maintained at about 30°C for 3 days while passing moist air therethrough. To the cultured material is added 500 liters of tap water, and the mixture liquid is filtered after stirring for 3 hrs, to obtain 469 liters of filtrate. The $\beta$-galactosidase activity of the filtrate is 48.6 ONPG Units/ml.or 36.7 Lactose Units/ml.

20 liters from the said filtrate is decolourized with active charcoal, and the resulting filtrate is concentrated under reduced pressure to about 4 liters. The concentrate is cooled to 15°C, and 4 liters of cold isopropanol (10°C) is added thereto while stirring. The precipitate formed is centrifuged, and to the precipitate are added 12 g. of maltose and 250 ml. of tap water. The resulting mixture liquid is lyophilized to yield 47.7 g. of white enzyme powder, the $\beta$-galactosidase activity of which is 17,200 ONPG Units/g. or 13,000 Lactose Units/g.

EXAMPLE 3

20 g. of the crude enzyme powder obtained in Example 2 is dissolved in 1 liter of tap water, and the solution is decolourized with active charcoal. The filtrate is cooled to 15°C, and 500 ml. of cold isopropanol (10°C) is added thereto while stirring. The precipitate formed is removed by centrifugation, and to the supernatant liquor is further added 700 ml. of cold isopropanol, followed by centrifugation of the precipitate again formed. To the latter precipitate are added 2.5 g. of maltose and 50 ml. of tap water, and the resulting mixture liquid is lyophilized to give 10.6 g. of white enzyme powder, the $\beta$-galactosidase activity of which is 25,300 ONPG Units/g. or 19,200 Lactose Units/g.

EXAMPLE 4

5 g. of the enzyme powder obtained in Example 3 is dissolved in 100 ml. of 0.05M tris-HCl buffer solution (pH 7.5), and after removal of the insoluble material by centrifugation, the supernatant liquor is subjected to dialysis to dialyze impurities contained therein using the same kind of buffer solution without the enzyme. The dialysate is applied to a column (4.8 × 90 cm) of DEAE Sephadex A-50, said column having been equilibrated in advance with the same kind of buffer solution. After the column is washed with the same kind of buffer solution, the absorbed enzyme in the column is eluted with the same kind of buffer solution but having gradually increasing NaCl concentration in the range of 0–0.5M. The eluate fractions exhibiting the $\beta$-galactosidase activity are collected, and subjected again to dialysis using the same kind of buffer solution. The refined enzyme solution thus obtained is lyophilized to give 1.6 g. of white powder, the $\beta$-galactosidase activity of which is 68,400 ONPG Units/g. or 51,800 Lactose Units/g.

What is claimed is:

1. Process for preparing β-galactosidase, which comprises culturing *Aspergillus oryzae* ATCC 20423 in a nutrient medium, under an aerobic condition, at temperature of 20°–45°C, to accumulate an acid-active, acid-stable β-galactosidase in the cultured material, recovering said β-galactosidase from said material and refining the same.

2. Process as claimed in claim 1, wherein a solid medium selected from the group consisting of wheat bran, soybean meal and rice bran, is used as the nutrient medium.

3. Process as claimed in claim 2, wherein the cultivation of the microorganism is carried out by using the solid culturing apparatus either of aeration type or of rotatory-drum type.

4. Process as claimed in claim 2, wherein the β-galactosidase accumulated in the cultured material is extracted firstly with water, without any destruction of the cell of the microorganism.

5. Process as claimed in claim 1, wherein a liquid medium is used as the nutrient medium, and the filtrate of the cultured broth is subjected to the recovering step of the enzyme, without any destruction of the cell of the microorganism.

6. Process as claimed in claim 1, wherein at least one refining procedure(s) selected from the group consisting of ion-exchange column-chromatography, gel-filtration and lyophilization are carried out in order to refine the enzyme.

7. Process as claimed in claim 6, wherein, in the lyophilization procedure of the enzyme containing material, maltose or glucose in an amount corresponding to 10–30 percent of the solid matter of said material is added thereto in advance.

* * * * *